Patented Mar. 8, 1932

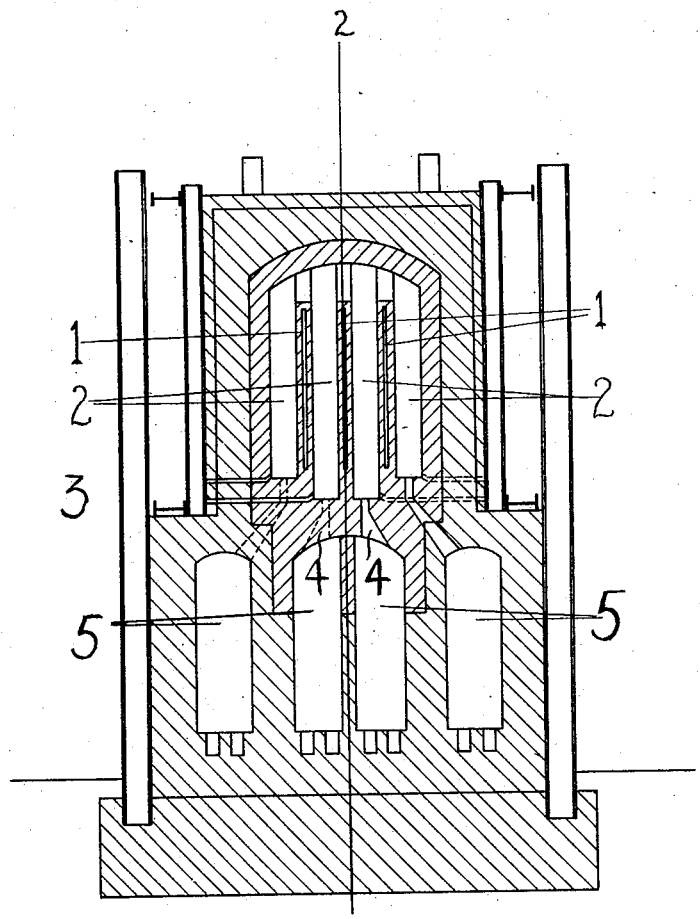

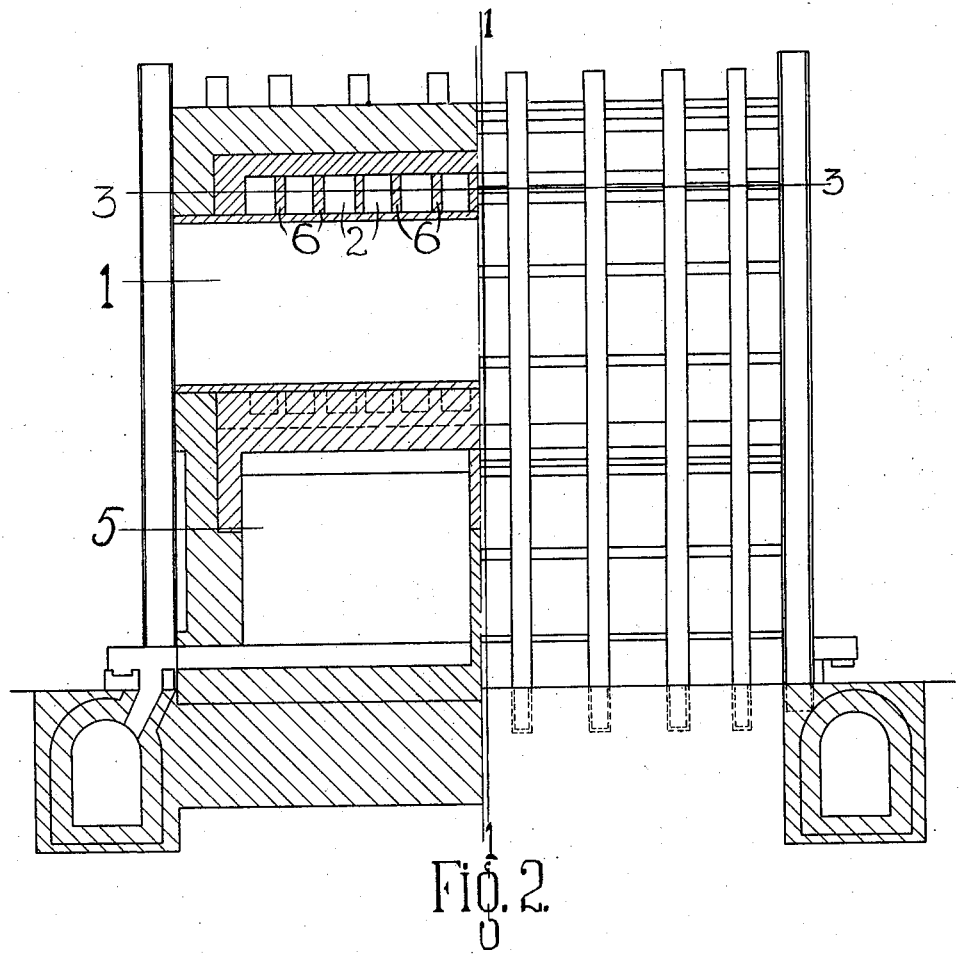
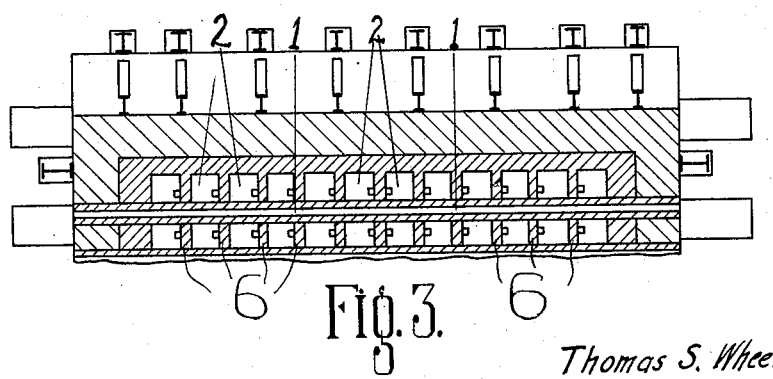

1,848,983

UNITED STATES PATENT OFFICE

THOMAS SHERLOCK WHEELER AND WILLIAM BALDWIN FLETCHER, OF NORTHWICH, ENGLAND, ASSIGNORS TO IMPERIAL CHEMICAL INDUSTRIES LTD., A CORPORATION OF GREAT BRITAIN

APPARATUS FOR CARRYING OUT GAS REACTIONS AT HIGH TEMPERATURES

Application filed February 21, 1931, Serial No. 517,622, and in Great Britain January 27, 1930.

This invention relates to an improved process and apparatus for carrying out gas reaction at high temperatures. The apparatus to be described may, for example, be utilized in the process described in our co-pending British application No. 9824/29 for producing hydrocyanic acid by interaction between ammonia and hydrocarbon gas, or in the process for producing benzene and other valuable unsaturated products by the pyrolysis of hydrocarbons. In such processes, the reacting gas or gases are passed at a high space velocity through a reaction zone heated to a very high temperature, and our apparatus is suitable for this type of process in general and is in no way limited to any specific case which may be referred to.

According to the invention, the reaction chamber is constructed so as to be long and deep in relation to its width, and is as far as possible totally enclosed within the heating media. Thus, on a large scale a number of units are built side by side into furnace setting, heating flues being provided between neighbouring walls of each pair of retorts. The furnace is gas fired to the required temperature (which will depend on the particular process under consideration). Further the reacting gases, may, when required, be preheated by means of heat exchange with the products of reaction or the heating gases.

We have found this type of reaction chamber to possess many advantages over existing types in the larger-scale operation of high temperature gas reactions. In dealing with reactions in which the high temperature is necessary to obtain good yields, it is often and usually necessary to employ a correspondingly high space velocity to avoid decomposition of reactants or products in an undesired manner, for example, decomposition of ammonia or of hydrocarbon into their elements, polymerization of hydrocyanic acid formed, in the process referred to above. Efficient heat transfer to the flowing gases is, therefore, essential, and a primary advantage of the above apparatus is that the heat transfer is both efficient and economical. The chambers being narrow we are enabled to supply the necessary heat and uniform heating while at the same time radiation of heat to outside air is avoided by using batteries in the manner described.

The dimensions of the plant, constructional materials employed, etc. must be considered in the light of the particular process for which it is utilized, and output required.

A suitable apparatus consists of chambers only one or two inches wide but many feet high and deep, constructed of or lined with sillimanite, and alternated in sandwich manner with heating flues, which need not necessarily be so narrow. Again referring to the hydrocyanic acid process, rough surfaces should be avoided, while the constructional materials or surfaces should not be such as to have a catalytic effect on the decomposition of ammonia or methane into their elements. For the same reason, packed chambers are avoided and in this case the surface-volume ratio should be no higher than is actually necessary for supplying the required amount of heat. Similar remarks apply to other high temperature gas reactions in which there is a tendency for undesired side reactions to take place where the surface-volume ratio is high.

A preferred form of the invention will now be described with reference to the accompanying drawings in which:—

Fig. 1 is a sectional end elevation of the apparatus taken on the line 1—1 of Fig. 2.

Figure 2 is a side elevation partly in section on the line 2—2 of Fig. 1, and

Fig. 3 is a portion of the sectional plan on the line 3—3 of Fig. 2.

The furnace consists of a number of long deep and very narrow reaction chambers 1 which are made of a highly refractory material, and which traverse a combustion chamber 2, lined with similar refractory material, from end to end. A number of walls 6, of highly refractory material are built across the combustion chamber and afford support to the walls of the reaction chamber. This combustion chamber is thus divided into a number of flues, which totally surround the reaction chambers 1, and give an efficient transfer of heat to the latter. Regenerators 5, for the preheating of the air required for combustion, are built below the combustion chamber and communicate therewith through the ports 4, while the gas for combustion is admitted through the ports 3. The direction of the flow of the preheated air and hot waste gases of combustion is reversed at intervals by any suitable valve mechanism, according to the well known principles of regeneration.

The gaseous reactants such as ammonia and hydrocarbon gas are first preheated by passage through any known form of recuperator and then pass rapidly through the reaction chambers 1 which are maintained at a very high temperature by the combustion of the gas in the flues 2. The desired reactions take place in the chambers 1 and the products pass out and through recuperators where their surplus heat is utilized in preheating further quantities of the reactants.

We claim:—

1. Apparatus for carrying out endothermic gas reactions at high temperatures of the order of 1000° C. and at high space velocity, comprising a number of unpacked reaction chambers, which are many feet long and deep but which have a width of the order of one to two inches only, the said chambers being arranged vertically side by side alternately with long and deep heating flues, and each chamber being adapted for the lengthwise passage of reaction gases at high space velocity.

2. Apparatus as claimed in claim 1 in which the reaction chambers are arranged in the combustion zone of the heating furnace and are supported on a plurality of transverse walls spanning said combustion zone, the space between neighboring reaction chambers forming heating flues for said chambers.

In testimony whereof we affix our signatures.

THOMAS SHERLOCK WHEELER.
WILLIAM BALDWIN FLETCHER.